US012289032B2

(12) United States Patent
Schmidt et al.

(10) Patent No.: US 12,289,032 B2
(45) Date of Patent: Apr. 29, 2025

(54) DRIVE ASSEMBLY HAVING AN ELECTRIC DRIVE AND TRANSMISSION

(71) Applicant: GKN Automotive Ltd., Birmingham (GB)

(72) Inventors: Mark Schmidt, Königswinter (DE); Nikolaus Mayr, Bruneck (IT); Sigmund Senoner, Bruneck (IT); Ralf Mertens, Kaarst (DE); Patrick Hilber, St. Lorenzen (IT)

(73) Assignee: GKN Automotive Limited, Birmingham (GB)

( * ) Notice: Subject to any disclaimer, the term of this patent is extended or adjusted under 35 U.S.C. 154(b) by 736 days.

(21) Appl. No.: 17/426,709

(22) PCT Filed: Feb. 14, 2019

(86) PCT No.: PCT/EP2019/053703
§ 371 (c)(1),
(2) Date: Jul. 29, 2021

(87) PCT Pub. No.: WO2020/164715
PCT Pub. Date: Aug. 20, 2020

(65) Prior Publication Data
US 2022/0099171 A1   Mar. 31, 2022

(51) Int. Cl.
*H02K 7/00*   (2006.01)
*B60K 1/00*   (2006.01)
(Continued)

(52) U.S. Cl.
CPC .............. *H02K 7/006* (2013.01); *B60K 1/00* (2013.01); *H02K 7/003* (2013.01);
(Continued)

(58) Field of Classification Search
CPC ........ H02K 7/003; H02K 7/006; H02K 7/116; B60K 1/00; B60K 2001/001
See application file for complete search history.

(56) References Cited

U.S. PATENT DOCUMENTS 4,811,616 A * 3/1989 Henderson ............ F16H 57/033
74/421 A
2011/0001400 A1   1/2011 Chiba et al.
(Continued)

FOREIGN PATENT DOCUMENTS

DE      19841159 A1    1/2000
DE   102009000915 A1   8/2010
(Continued)

OTHER PUBLICATIONS

Calmettes, Machine Translation of WO2016177549, Nov. 2016 (Year: 2016).*
(Continued)

*Primary Examiner* — Eric Johnson
(74) *Attorney, Agent, or Firm* — Reising Ethington P.C.

(57) ABSTRACT

A drive assembly comprises at least an electric drive having a drive shaft, and a transmission having at least one input shaft, wherein a drive power of the electric drive can be transmitted to the input shaft via the drive shaft, and can be transmitted from the input shaft into the transmission. The drive shaft and the input shaft are coaxial to one another and are interconnected by way of a toothing that is form-fitting at least in a circumferential direction. The drive shaft and the input shaft are at least frictionally connected at least in relation to an axial direction at least via a press fit formed in each case between an inner circumferential surface and an outer circumferential surface which are parallel to an axis of rotation, or the drive shaft and the input shaft together form a form-fitting connection via a connecting element.

10 Claims, 3 Drawing Sheets

(51) Int. Cl.
_F16H 57/02_ (2012.01)
_H02K 7/116_ (2006.01)

(52) U.S. Cl.
CPC ............... _B60K 2001/001_ (2013.01); _F16H 2057/02034_ (2013.01); _H02K 7/116_ (2013.01)

(56) References Cited

U.S. PATENT DOCUMENTS

| | | | | |
|---|---|---|---|---|
| 2011/0290071 A1* | 12/2011 | Giessner | ............... | B60K 6/48 |
| | | | | 903/909 |
| 2013/0193816 A1 | 8/2013 | Iwase et al. | | |
| 2015/0038277 A1* | 2/2015 | Tamura | ............... | B60L 15/2054 |
| | | | | 475/150 |

FOREIGN PATENT DOCUMENTS

| | | |
|---|---|---|
| EP | 1125780 A2 | 8/2001 |
| EP | 2819277 A1 | 12/2014 |
| JP | 2000035092 A | 2/2000 |
| JP | 2007333154 A | 12/2007 |
| JP | 2009071905 A | 4/2009 |
| JP | 2012518128 A | 8/2012 |
| JP | 2013155810 A | 8/2013 |
| JP | 2013176209 A | 9/2013 |
| JP | 2016090013 A | 5/2016 |
| WO | 2010094530 A1 | 8/2010 |
| WO | WO-2016177549 A1 * 11/2016 ............. F16D 1/101 |
| WO | 2018086679 A1 | 5/2018 |
| WO | WO-2020086997 A1 * 4/2020 | |

OTHER PUBLICATIONS

Japanese Patent Office Notification of Reasons for Refusal for related Application No. JP2021-547445 mailed Oct. 25, 2020 (12 pages; with English machine translation).
International Search Report and Written Opinion for PCT/EP2019/053703 mailed Sep. 11, 2019 (13 pages; with English translation).
CIPO Office Action for related application No. CN201980092008.6 mailed Jun. 7, 2023 (14 pages; with English translation).

* cited by examiner

DRIVE ASSEMBLY HAVING AN ELECTRIC DRIVE AND TRANSMISSION

CROSS-REFERENCE TO RELATED APPLICATION

This application is a national stage of, and claims priority to, Patent Cooperation Treaty Application No. PCT/EP2019/053703, filed on Feb. 14, 2019, which application is hereby incorporated herein by reference in its entirety.

BACKGROUND

Drive assemblies are known in which a drive shaft of a drive extends through a transmission. In this case, an input shaft of the transmission assembly is arranged coaxially on the drive shaft and is connected to it for conjoint rotation therewith.

In this known embodiment of a drive assembly, the motor and transmission are assembled first of all and only then is the functionality of the transmission checked. Functional testing of the transmission independently of the motor is thus not possible since the input shaft of the transmission is mounted only on the drive shaft, but the drive shaft is connected to the motor.

There is a constant interest in further developing the drive assemblies for motor vehicles. In this connection, it was recognized that separating the functional testing of the motor and transmission or separate functional testing of the transmission alone is advantageous. This allows component manufacturers to test individual components (here transmissions on the one hand and drives on the other) independently of one another and makes it possible to provide the manufacturer with an assembly including a drive and a transmission. Faults can thus be detected at an early stage and assigned to a component even before the drive and transmission are assembled. Responsibilities of the different component manufacturers can thus be clearly distinguished from one another.

A motor-transmission assembly (drive assembly) is known from WO 2018/086679 A1. In this assembly, two shafts arranged coaxially with one another are arranged so as to overlap one another along the axial direction and are connected to one another for conjoint rotation by way of a connection (splines/plug-in splines) which forms a positive connection in the circumferential direction. Here, separate functional testing of the transmission is already possible.

SUMMARY

Disclosed herein is a drive assembly which has advantages with regard to handling, ease of assembly, fault checking ability and/or functionality. The drive assembly comprises an electric drive having a drive shaft and a transmission having at least one input shaft, wherein a drive power of the electric drive can be transmitted to the input shaft via the drive shaft and from the input shaft to the transmission. As an option, the drive assembly can be arranged in a motor vehicle, which is operated, for example, purely electrically by an electric machine as a motor (BEV battery electric vehicle). The drive assembly serves to generate and transmit a (drive) torque of an (electric) drive to the input shaft of the transmission. At least one wheel of a motor vehicle is driven via the drive assembly.

The features listed individually in the claims can be combined with one another in any technologically feasible manner and can be supplemented by explanatory facts from the description and details from the figures, indicating further embodiments and variations.

The disclosed drive assembly comprises an electric drive having a drive shaft and a transmission having at least one input shaft (and an output shaft, wherein the input shaft and the output shaft can be connected to one another in a torque-transmitting manner via a selectable or variable transmission). A drive power of the electric drive can be transmitted to the input shaft via the drive shaft and from the input shaft to the transmission (toward the output shaft), wherein the drive shaft and the input shaft are arranged coaxially with one another and are positively connected to one another by way of a toothing system (or connection, that is to say a plug-in spline system, splined toothing system, slot-and-key connection, etc.) which is positively connected at least in a circumferential direction, wherein the drive shaft and the input shaft are at least nonpositively connected at least with respect to an axial direction at least a) via a press fit formed between an inner circumferential surface parallel to an axis of rotation and an outer circumferential surface parallel to the axis of rotation, or b) (are positively connected and) together form a positive connection via a connecting element.

In particular, the drive shaft is or can be connected to a rotor of the electric drive or to the rotor for conjoint rotation therewith. The drive shaft extends, in particular, along the axis of rotation (parallel to the axial direction) through the drive and serves to transmit a torque generated by the drive in the direction toward the transmission. The input shaft is a component of the transmission and receives the torque of the drive from the drive shaft and introduces it into the transmission. The input shaft and the drive shaft are, in particular, components which are produced separately from one another and are connected to one another for conjoint rotation only in the context of the drive and transmission being assembled.

The input shaft and the drive shaft are arranged relative to one another in such a way that parts of the shafts overlap one another along the axial direction. In this case, one shaft extends into the other shaft, which is embodied at least partially as a hollow shaft. In the region of this overlap of the shafts, it is possible, for example, for the press fit to be formed between the shafts (with an oversize of 0 to 100 μm (micrometers), in particular between 0 and 50 μm). In particular, the shafts have an outside diameter of at most 100 mm (millimeters), preferably less than 50 mm.

Alternatively or in addition to the press fit, the shafts can be connected in the region of the overlap by a positive (i.e., form-locking or form-fitting) connection with respect to the axial direction. In particular, a connecting element is provided to form the positive connection.

Positive connections are formed, in particular, by the interlocking of at least two connection partners. As a result, the connection partners cannot become detached even when there is no power transmission or when power transmission is interrupted. In other words, in the case of a positive connection, one of the connection partners is in the way of the other. Nonpositive connections presuppose a normal force on the surfaces to be connected to one another. Their mutual displacement is prevented as long as the counterforce caused by the static friction is not exceeded. The nonpositive or frictional engagement is lost and the surfaces slide on one another when the tangentially acting load force is greater than the static friction force.

As a result of the nonpositive (friction-locking or force-locking) and/or positive (form-locking or form-fitting) connection with respect to the axial direction, the positions of the shafts can be fixed with respect to the axial direction. The press fit formed by the circumferential surfaces contacting one another makes it possible to center the shafts relative to one another (with respect to a radial direction) and/or to adjust an overall length of the shaft assembly including the drive shaft and the input shaft.

In particular, the connecting element is a screw and has an (internal or external) thread which interacts with a mating thread on one of the drive shaft and the input shaft in order to form the positive connection. Other positive connections are also possible here, for example by forming a bayonet lock or the like.

In particular, a positive connection between the connecting element and one of the drive shaft and the input shaft is arranged within the other of the input shaft and the drive shaft in a radial direction. In particular, the connecting element is arranged at least partially inside one of the two shafts, preferably in a shaft embodied as a hollow shaft.

In particular, the input shaft or the drive shaft is supported on a housing of the drive assembly via a first stop (and optionally via a rolling bearing and/or the other shaft) with respect to the axial direction, wherein a minimum distance (along the axial direction) between

- a positive connection between the connecting element and one of the drive shaft and the input shaft (in particular the shaft supported on the first stop)
- and the first stop is at least 20% of a maximum length of the shaft which forms the or a positive connection (and, in particular, is supported on the first stop).

The length of a shaft extends, in particular, between a first end and a second end of the shaft along the axial direction.

Owing to the distance between the first stop and the positive connection, it is possible, in particular, for an elasticity of the relevant shaft to be exploited for the operation or assembly of the drive assembly. In particular, it is possible in this way to adjust a prestress of the shafts, wherein the adjustable prestress increases with increasing distance and thus increasing available elasticity of the shaft. In particular, it is also possible in this context to exploit an elasticity of the connecting element, which is supported on a second stop with respect to the axial direction.

In particular, the input shaft extends along an axial direction between a first input shaft end and a second input shaft end, wherein the first input shaft end is arranged within the drive shaft and in this case forms the press fit or forms the positive connection with the connecting element.

However, a reverse arrangement is also possible, in which the drive shaft extends into the input shaft and forms the press fit with the second drive shaft end or forms the positive connection with the connecting element.

In particular, the drive shaft extends from a first drive shaft end and along the axial direction toward the input shaft up to a second drive shaft end, wherein the connecting element can be arranged in the drive shaft via the first drive shaft end to form the positive connection.

However, another arrangement is also possible, in which the connecting element can be arranged in the input shaft via an input shaft end. In particular, the connecting element can be arranged in the input shaft via the second input shaft end in order to form the positive connection with the second drive shaft end.

The arrangement of the connecting element via the first drive shaft end (or via one, or the second, input shaft end) makes it possible for the shafts to be slid into one another for the assembly of the transmission and the drive and, after assembly has been carried out in this way, to be fixed in position with respect to one another by means of the connecting element.

In particular, the connecting element is supported on the drive shaft (alternatively on the input shaft) on a second stop with respect to the axial direction, wherein the second stop is arranged outside the drive shaft at the first drive shaft end or is arranged within the drive shaft (for example on a shoulder of the drive shaft or on a shoulder on the inner circumferential surface of the drive shaft).

In particular, the drive assembly at least additionally has a multi-part housing having a first housing part and a second housing part, wherein the electric drive is arranged with the drive shaft in the first housing part and the transmission is arranged with the input shaft in the second housing part, wherein the first input shaft end can be inserted into the drive shaft or the second drive shaft end can be inserted into the input shaft to connect the housing parts. In particular, at least the first housing part or the second housing part is likewise of multi-part design.

In particular, the input shaft is rotatably mounted in the second housing part via two rolling bearings arranged at a distance from one another along the axial direction. In particular, the drive shaft is rotatably mounted in the first housing part via just one rolling bearing.

In particular, an installation position of the input shaft can be fixed or determined (in particular with respect to the radial direction and with respect to the axial direction) by the arrangement of the rolling bearings.

However, another arrangement is also possible, in which the drive shaft is rotatably mounted in the first housing part via two rolling bearings arranged at a distance from one another along the axial direction. In particular, the input shaft is rotatably mounted in the second housing part via just one rolling bearing.

In particular, an installation position of the drive shaft can be fixed or determined (in particular with respect to the radial direction and with respect to the axial direction) by the arrangement of the rolling bearings.

As a result of the mounting of the input shaft in the second housing part, it is possible, in particular, for functional testing of the transmission to take place even without the drive, the drive shaft and the first housing part. As a result of the mounting of the input shaft on the second partial housing via the rolling bearings, a functionality of the transmission can also be tested independently of the drive. For this purpose, the transmissions produced can be arranged on a test bench, for example, each transmission being driven via a drive shaft of the test bench and not via the drive shaft of the drive to be connected subsequently to the respective transmission.

In particular, the drive shaft can be connected to the input shaft in such a way that the drive shaft is also fixed in position with respect to the axial direction via the input shaft fixed in position with respect to the housing. In particular, the drive shaft can be mounted on the first housing part via a non-locating bearing.

However, another arrangement is also possible in which the drive shaft is connected to the input shaft in such a way that, via the drive shaft fixed in position with respect to the housing, the input shaft is also fixed in position with respect to the axial direction. In particular, the input shaft can be mounted on the second housing part via a non-locating bearing.

In particular, the shafts (input shaft and drive shaft) are fixed in position in the radial direction at least also by means of the press fit. In particular, the shafts (input shaft and drive shaft) are fixed in position in the axial direction by means of the press fit and/or the positive connection between the connecting element and one of the shafts.

As a result of the mounting of the drive shaft on the housing via a rolling bearing, a functionality of the drive can also be tested independently of the transmission. For this purpose, the drives produced can be arranged on a test bench, for example, each drive being driven via an input shaft of the test bench and not via the input shaft of the transmission to be connected subsequently to the respective drive.

The first housing part and the second housing part are preferably fluidically separated from one another by means of at least one first seal (e.g. a shaft sealing ring, in particular a dynamic seal, i.e., the seal moves relative to the sealing surface, in this case relative to the input shaft) arranged between the input shaft and the second housing part or by means of at least one first seal arranged between the drive shaft and the first housing part.

In particular, when the first seal is arranged between the input shaft and the second housing part, the second housing part with the transmission arranged therein (and the associated lubrication) and the input shaft can be sealed off fluidtightly from the first housing part. In particular, the second housing part can thus be produced and tested in fully functional form without the need for assembly with the drive and the first housing part.

In particular, the first housing part and the second housing part are fluidically separated from one another by means of at least one second seal (preferably an O-ring, in particular a static seal, that is to say a seal wherein there is no relative movement between the seal and the sealing surface, in this case between the shafts) arranged between the input shaft and the drive shaft.

In particular, a third seal (preferably an O-ring, in particular a static seal, that is to say a seal wherein there is no relative movement between the seal and the sealing surface, in this case between the drive shaft and the connecting element) is arranged between the connecting element and the respective shaft, that is to say the drive shaft or the input shaft. In particular, it is possible to arrange between the third seal and the second seal a medium which can prevent or at least reduce wear phenomena (e.g. "fretting corrosion").

In particular (preferably when the input shaft extends into the drive shaft), the drive shaft is formed of an unhardened material or is at least partially hardened only at an inner circumferential surface. The input shaft is preferably fully hardened. A hardened state refers to a heat treatment of the shaft to change the structure of the material, after which a conversion of the structure and an associated increase in the hardness of the material of the shaft are achieved as a result of the heat treatment.

In particular, it is possible in this way, at least in the case of a shaft, not to have to increase the hardness. This is achieved, in particular, by virtue of the fact that the input shaft extends into the drive shaft and, in the process, forms the positive connection in the circumferential direction at an outer circumferential surface. The toothing system formed on an outer circumferential surface, in particular, requires an increase in hardness. The input shaft should already be hardened owing to the function of torque transmission into the transmission. A synergy effect can thus be exploited here. As a result, the drive shaft is embodied with a toothing system on the inner circumferential surface. As a rule, no increase in hardness is required for this toothing system, and therefore no increase in hardness at all may be required for the entire drive shaft or no increase in hardness is required only on the inner circumferential surface.

A motor vehicle is furthermore disclosed having at least an axle and a drive train for driving at least the axle, wherein the drive train has at least the drive assembly.

The explanations of the drive assembly can be applied, in particular, to the motor vehicle and vice versa.

As a precaution, it should be noted that the ordinals used here ("first", "second", . . . ) serve primarily (only) to distinguish a plurality of similar objects, sizes or processes, that is to say, in particular, do not necessarily specify any dependence and/or sequence of these objects, sizes or processes with respect to one another. Should a dependency and/or sequence be required, this is explicitly stated here or it is obvious for a person skilled in the art when studying the specifically described embodiment.

BRIEF SUMMARY OF THE DRAWINGS

Further explanation is provided in greater detail with reference to the figures. It should be noted that the exemplary embodiments shown are not intended to restrict the claimed invention. In particular, unless explicitly stated otherwise, it is also possible to extract partial aspects of the facts explained in the figures and to combine them with other components and insights from the present description and/or figures. Identical reference signs denote identical objects, and therefore it may be possible to use explanations from other figures in addition. The figures are schematic

DESCRIPTION

Figure 1:
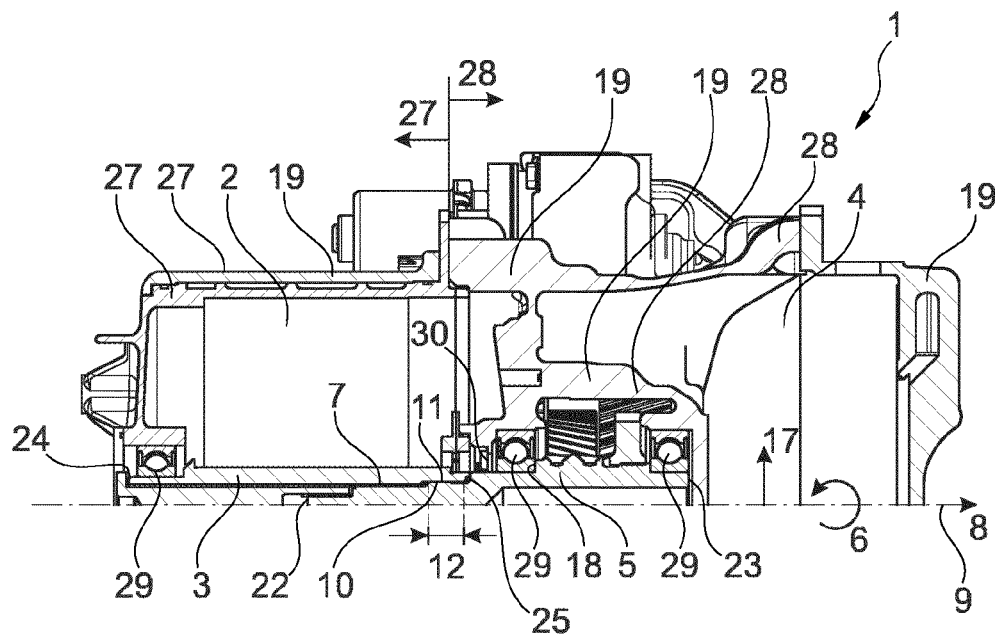
FIG. 1: shows a first embodiment of the drive assembly in a side view in section.

FIG. 1 shows a first embodiment of the drive assembly 1 in a side view in section. The drive assembly 1 comprises an electric drive 2 having a drive shaft 3 and a transmission 4 having an input shaft 5. The drive shaft 3 and the input shaft 5 are arranged coaxially with one another and are connected to one another by way of a toothing system 7 which is positively connected at least in a circumferential direction 6. The drive shaft 3 and the input shaft 5 are at least nonpositively connected with respect to an axial direction 8 via a press fit 12 formed between an inner circumferential surface 10 parallel to an axis of rotation 9 and an outer circumferential surface 11 parallel to the axis of rotation 9.

The drive assembly 1 additionally has a multi-part housing 19 having a first housing part 27 and a second housing part 28, wherein the electric drive 2 is arranged with the drive shaft 3 in the first housing part 27 and the transmission 4 is arranged with the input shaft 5 in the second housing part 28. To connect the housing parts 27, 28, the first input shaft end 22 can be inserted into the drive shaft 3. The input shaft 5 is rotatably mounted in the second housing part 28 via two rolling bearings 29 arranged at a distance from one another along the axial direction 8. An installation position of the input shaft 5 is fixed or determined (with respect to the radial direction 17 and with respect to the axial direction 8) by the arrangement of the rolling bearings 29.

As a result of the mounting of the input shaft 5 in the second housing part 28, functional testing of the transmission 4 can take place even without the drive 2, the drive shaft 3 and the first housing part 27.

Figure 2:
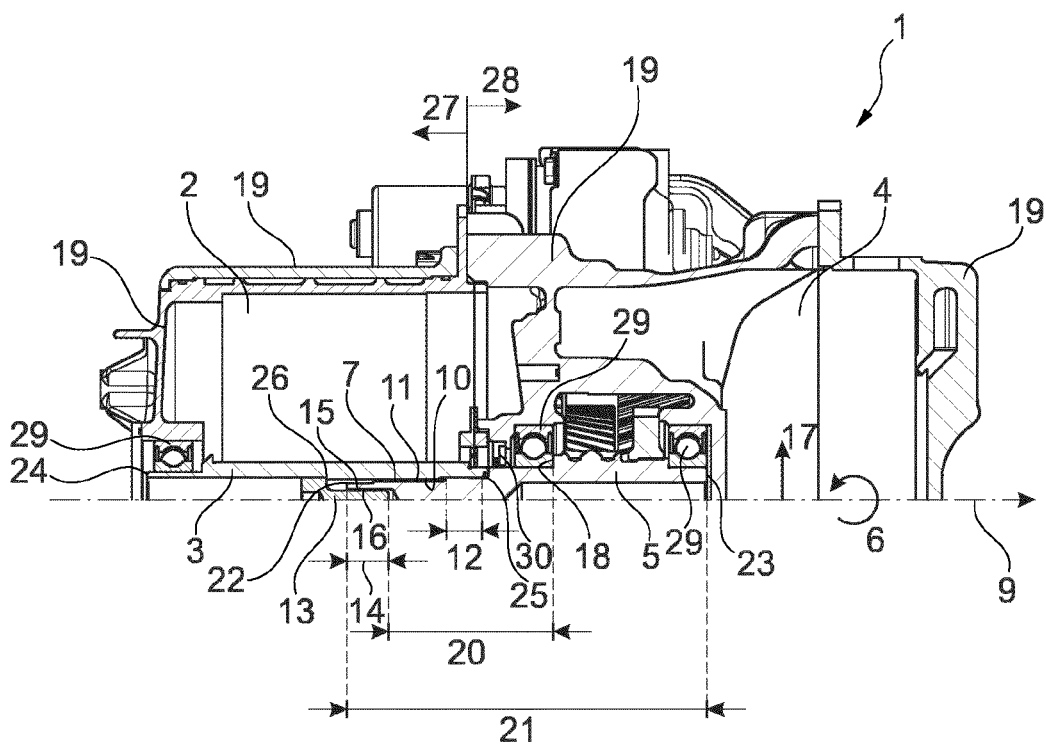
FIG. 2: shows a second embodiment of the drive assembly in a side view in section.
Figure 3:
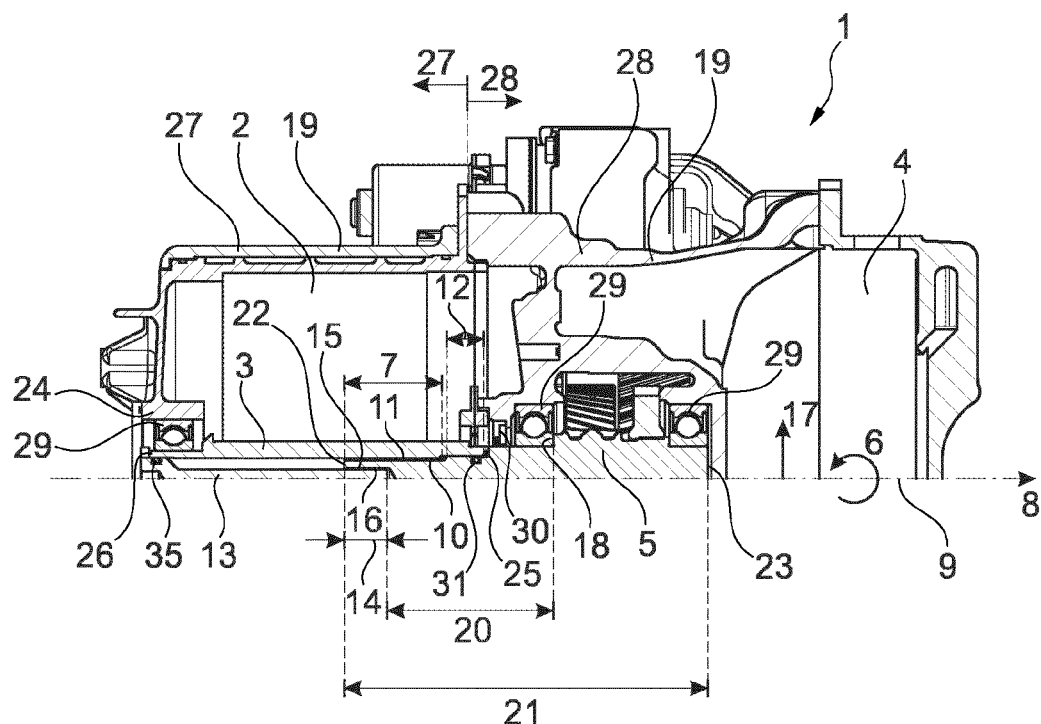
FIG. 3: shows a third embodiment of the drive assembly in a side view in section.

The drive shaft 3 is rotatably mounted in the first housing part 27 via just one rolling bearing 29. The drive shaft 3 is connected to the input shaft 5 in such a way that the drive shaft 3 is also fixed in position with respect to the axial direction 8 via the input shaft 5 fixed in position with respect to the housing 19. In particular, positional fixing with respect to the radial direction 17 or coaxial arrangement of the input shaft 5 and of the drive shaft 3 is accomplished at least by means of the connection of the two shafts 3, 5, that is to say in particular by means of the press fit 12. Fixing of the position with respect to the axial direction 8 is accomplished in particular by means of the press fit 12 or the positive connection 14, which is illustrated in FIGS. 2 and 3. The drive shaft 3 is mounted on the first housing part 27 via a non-locating bearing.

The first housing part 27 and the second housing part 28 are fluidically separated from one another by means of a first seal 30 (in this case a shaft sealing ring) arranged between the input shaft 5 and the second housing part 28. This enables the second housing part 28 with the transmission 4 arranged therein and the associated lubrication and the input shaft 5 to be sealed off fluidtightly from the first housing part 27. Furthermore, the second housing part 28 can thus be produced and tested in fully functional form without the need for assembly with the drive 2 and the first housing part 27.

The input shaft 5 extends along the axial direction 8 between a first input shaft end 22 and a second input shaft end 23, wherein the first input shaft end 22 is arranged within the drive shaft 3 and forms the press fit 12 and the positive toothing system 7.

To assemble the drive assembly 1, the second housing part 28 with transmission 4 and input shaft 5 is made available. The first housing part 27 with the drive 2 and the drive shaft 3 is made available and pushed onto the second housing part 28 along the axial direction 8, wherein the input shaft 5 centers the drive shaft 3 by means of the outer circumferential surface 11 via the inner circumferential surface 10. During this process, the first input shaft end 22 is inserted into the drive shaft 3. The shafts can be displaced relative to one another along the axial direction 8 by means of an assembly tool 36, which can be inserted into the drive shaft 3 via a first drive shaft end 24. The assembly tool 36 interacts with the first input shaft end 22 via a threaded connection and is supported on the first drive shaft end 24. As a result of the rotation of the assembly tool 36, the drive shaft 3 can be pushed onto the input shaft 5 via the threaded connection to the input shaft 5 and thus the press fit 12 can be formed. During this process, the drive shaft 3 can be pushed against a stop of the input shaft 5, wherein a preload can be set, for example, by means of spring elements between the drive shaft 3 and the stop of the input shaft 5. Furthermore, a displacement path of the drive shaft 3 along the input shaft 5 during assembly can be shortened or adjusted, for example by means of washers arranged on the stop. The assembly tool 36 can be removed after the arrangement and connection of the housing parts 27, 28 to the housing 19.

FIG. 2 shows a second embodiment of the drive assembly 1 in a side view in section. Attention is drawn to the explanations of FIG. 1.

In contrast to the first embodiment, a positive connection 14 with respect to the axial direction between the connecting element 13 and the first input shaft end 22 is provided here in addition to the press fit 12 and the toothing system 6 which provides a positive connection with respect to the circumferential direction 6. The positive connection 14 is formed via a thread 15 of the connecting element 13 and a mating thread 16 of the input shaft 5.

The drive shaft 3 extends from a first drive shaft end 24 and along the axial direction 8 toward the input shaft 5 up to a second drive shaft end 25, wherein the connecting element 13 can be arranged in the drive shaft 3 via the first drive shaft end 24 to form the positive connection 14. The arrangement of the connecting element 13 via the first drive shaft end 24 makes it possible for the shafts 3, 5 to be slid into one another for the assembly of the transmission 4 and the drive 2 and, after the assembly is carried out in this way, to be fixed in position with respect to one another by means of the connecting element 13.

The connecting element 13 is supported on the drive shaft 3 on a second stop 26 with respect to the axial direction 8, wherein the second stop 26 is arranged within the drive shaft 3 (in this case on a shoulder on the inner circumferential surface 10 of the drive shaft 3).

The input shaft 5 is supported via a first stop 18 on a housing 19 (the second housing part 28) of the drive assembly 1 with respect to an axial direction 8 (in this case via the bearing inner ring of the rolling bearing 29), wherein a minimum distance 20 (along the axial direction 8) between the positive connection 14 between the connecting element 13 and the input shaft 5 and the first stop 18 is approximately 50% of a maximum length 21 of the input shaft 5 forming the positive connection 14 (between the first input shaft end 22 and the second input shaft end 23).

Owing to the distance 20 between the first stop 18 and the positive connection 14, an elasticity of the input shaft 5 can be exploited for the operation or assembly of the drive assembly 1. In particular, a prestress or preload of the shafts 3, 5 can be set in this way, wherein the adjustable prestress increases with increasing distance 20 and thus increasing available elasticity of the input shaft 5.

The connecting element 13 can be arranged in the drive shaft 3 via the first drive shaft end 24 to form the positive connection 14. The arrangement of the connecting element 13 via the first drive shaft end 24 makes it possible for the shafts 3, 5 to be slid into one another for the assembly of the transmission 4 and the drive 2 and, after the assembly is carried out in this way, to be fixed in position with respect to one another by means of the connecting element 13.

FIG. 3 shows a third embodiment of the drive assembly 1 in a side view in section. Attention is drawn to the explanations of FIGS. 1 and 2.

In contrast to the second embodiment, the connecting element 13 is supported on the drive shaft 3 on a second stop 26 with respect to the axial direction 8, wherein the second stop 26 is arranged outside the drive shaft 3 on the first drive shaft end 24. Thus, when there is trapped stress in the drive shaft 3 and the input shaft 5, the elasticity of the input shaft 5 (the distance 20) and of the connecting element 13 can be exploited.

Furthermore, the first housing part 27 and the second housing part 28 are in this case fluidically separated from one another by means of a second seal 31 (in this case an O-ring) arranged between the input shaft 3 and drive shaft 5. In addition, a third seal 35 is arranged between the connecting element 13 and the drive shaft 3.

Figure 4:
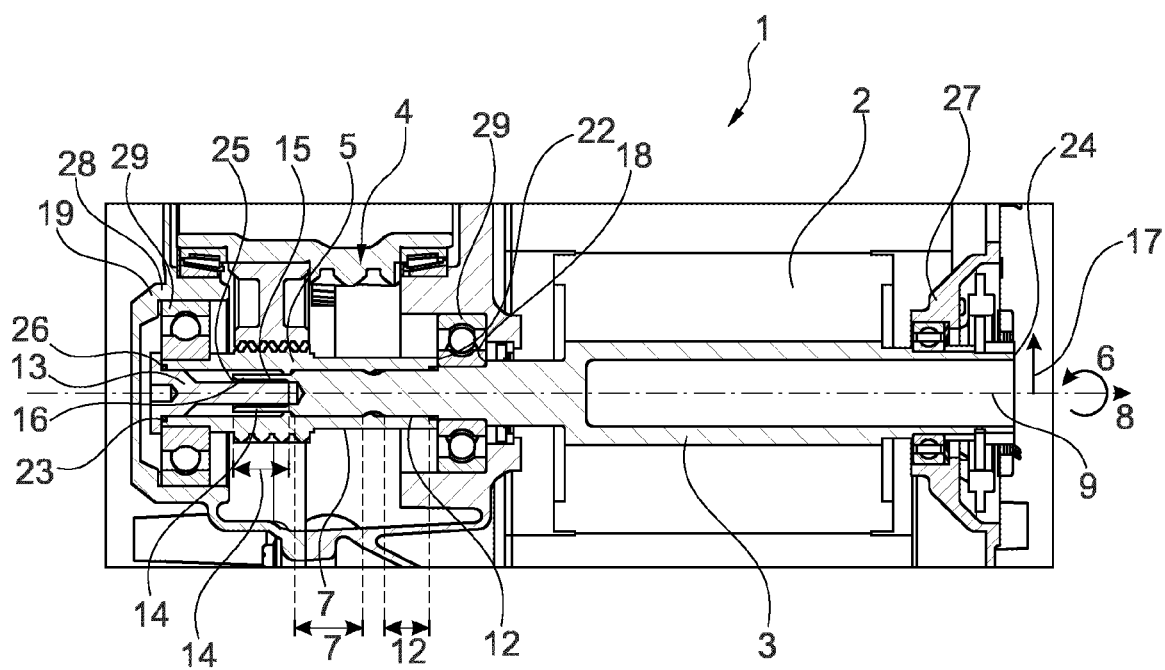
FIG. 4: shows a fourth embodiment of the drive assembly in a side view in section.
Figure 5:
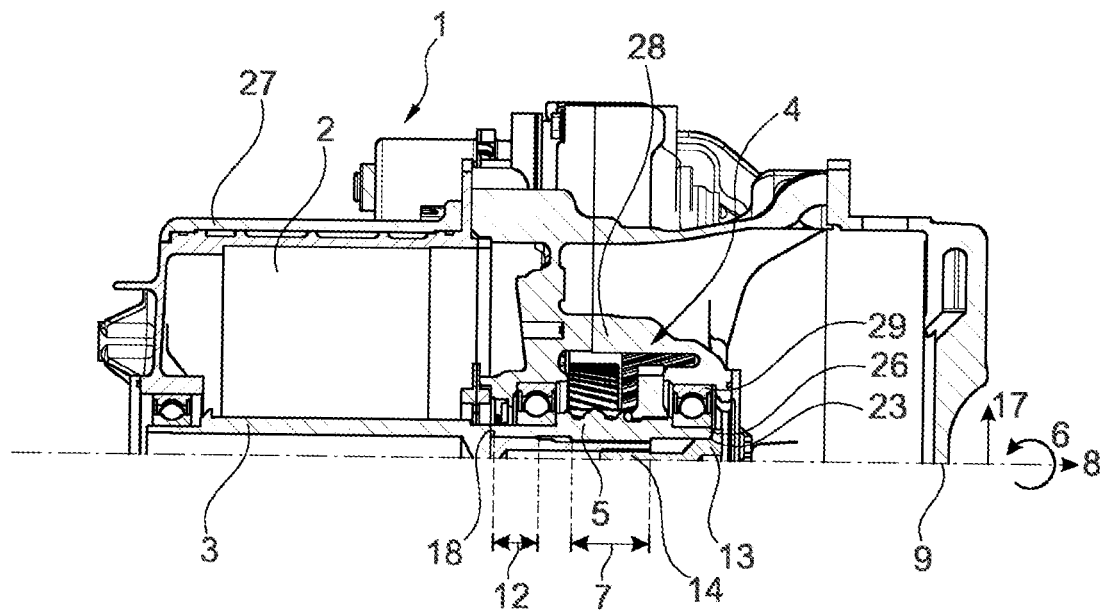
FIG. 5 shows a fifth embodiment of the drive assembly in a side view in section.

FIG. 4 shows a fourth embodiment of the drive assembly 1 in a side view in section. FIG. 5 shows a fifth embodiment of the drive assembly 1 in a side view in section. FIGS. 4 and 5 are described jointly below. Attention is drawn to the explanations of FIG. 3.

In contrast to FIG. 3, the arrangement of the components comprising the drive 2 and the transmission 4 has been swapped here, i.e. the drive shaft 3 extends along the axial direction 8 between a first drive shaft end 24 and a second drive shaft end 25, while the second drive shaft end 25 is arranged within the input shaft 5 and forms the press fit 12 and the positive toothing system 7. In addition to the press fit 12 and the toothing system 7 which provides a positive connection with respect to the circumferential direction 6, a positive connection 14 with respect to the axial direction 8 between the connecting element 13 and the second drive shaft end 25 is furthermore provided. The positive connection 14 is formed by means of a thread 15 of the connecting element 13 and a mating thread 16 of the drive shaft 3. The connecting element 13 extends into the input shaft 5 via a second input shaft end 23 and is connected to the second drive shaft end 25 via the positive connection 14.

Furthermore, the connecting element 13 is supported on the input shaft 5 on a second stop 26 with respect to the axial direction 8, wherein the second stop 26 is arranged outside the input shaft 5 on the second input shaft end 23.

In the fourth embodiment according to FIG. 4, the drive shaft 3 is supported via a first stop 18 (and via a rolling bearing 29, the input shaft 5 and a further rolling bearing 29) on a housing 19 (in this case the second housing part 28) of the drive assembly 1 with respect to the axial direction 8.

In the fifth embodiment according to FIG. 5, the drive shaft 3 is supported via a first stop 18 (via the input shaft 5 and a rolling bearing 29) on a housing 19 (in this case the second housing part 28) of the drive assembly 1 with respect to the axial direction 8.

In the fourth embodiment according to FIG. 4, the connecting element 13 also extends beyond the second input shaft end 23 in the radial direction 17 and forms a stop for the inner ring of the rolling bearing 29.

Figure 6:
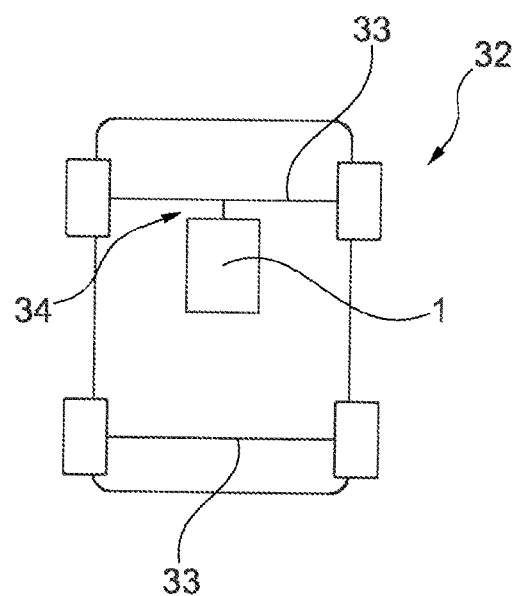
FIG. 6: shows a motor vehicle.

FIG. 6 shows a motor vehicle 32 having at least two axles 33 with wheels and a drive train 34 for driving an axle 33, wherein the drive train 34 has the drive assembly 1.

LIST OF REFERENCE SIGNS 1 drive assembly
2 drive
3 drive shaft
4 transmission
5 input shaft
6 circumferential direction
7 toothing system
8 axial direction
9 axis of rotation
10 inner circumferential surface
11 outer circumferential surface
12 press fit
13 connecting element
14 connection
15 thread
16 mating thread
17 radial direction
18 first stop
19 housing
20 minimum distance
21 maximum length
22 first input shaft end
23 second input shaft end
24 first drive shaft end
25 second drive shaft end
26 second stop
27 first housing part
28 second housing part
29 rolling bearing
30 first seal
31 second seal
32 motor vehicle
33 axle
34 drive train
35 third seal
36 assembly tool

The invention claimed is:

1. A drive assembly, comprising:
an electric drive having a drive shaft;
a transmission having at least one input shaft; and
a multi-part housing having a first housing part and a second housing part, wherein the electric drive is arranged with the drive shaft in the first housing part and the transmission is arranged with the input shaft in the second housing part, wherein a first input shaft end can be inserted into the drive shaft or the second drive shaft end can be inserted into the input shaft to connect the housing parts;
wherein the first housing part and the second housing part are fluidically separated from one another by at least one first seal arranged between and contacting the input shaft and the second housing part;
wherein a drive power of the electric drive is transmissible to the input shaft via the drive shaft and from the input shaft to the transmission;
wherein the drive shaft and the input shaft are arranged coaxially with one another and are connected to one another by a first form-locking connection by way of a toothing system which is connected in a circumferential direction; and
wherein the drive shaft and the input shaft are at least connected with respect to an axial direction by at least one of
(a) a press fit formed between an inner circumferential surface and an outer circumferential surface which are parallel to an axis of rotation, or
(b) the drive shaft and the input shaft together forming a second form-locking connection via a connecting element, wherein the drive shaft or the input shaft is supported on a housing of the drive assembly via a first stop with respect to the axial direction, wherein a minimum distance between (a) the second form-locking connection between the connecting element and one of the drive shaft and the input shaft, and (b) the first stop, is at least 20% of a maximum length of the shaft which forms the second form-locking connection.

2. The drive assembly of claim 1, wherein the second form-locking connection between the connecting element and one of the drive shaft and the input shaft is arranged within the other of the input shaft and the drive shaft in a radial direction.

3. The drive assembly of claim 1, wherein the input shaft extends along the axial direction between the first input shaft end and a second input shaft end, wherein the drive shaft extends along the axial direction between a first drive shaft end and a second drive shaft end; wherein the first input shaft end is arranged within the drive shaft or the second drive shaft end is arranged within the input shaft and forms the press fit or, with the connecting element, the second form-locking connection.

4. The drive assembly of claim 3, wherein the connecting element can be arranged in the drive shaft via the first drive shaft end or in the input shaft via the second input shaft end to form the second form-locking connection.

5. The drive assembly of claim 4, wherein the connecting element is supported on the drive shaft or on the input shaft on a second stop with respect to the axial direction, wherein the second stop is arranged outside the respective shaft at the first drive shaft end or the second input shaft end, or is arranged within the respective shaft.

6. The drive assembly of claim 1, wherein the input shaft is rotatably mounted in the second housing part or the drive shaft is rotatably mounted in the first housing part via two rolling bearings arranged at a distance from one another along the axial direction.

7. The drive assembly of claim 1, wherein the drive shaft is rotatably mounted in the first housing part or the input shaft is rotatably mounted in the second housing part via only one rolling bearing.

8. The drive assembly of claim 1, wherein the first housing part and the second housing part are fluidically separated from one another by at least one second seal arranged between the input shaft and the drive shaft.

9. The drive assembly of claim 1, wherein the drive shaft consists of an unhardened material or is at least partially hardened only at an inner circumferential surface, and the input shaft is fully hardened.

10. A motor vehicle, comprising:
an axle and a drive train for driving at least the axle;
wherein the drive train includes:
an electric drive having a drive shaft;
a transmission having at least one input shaft; and
a multi-part housing having a first housing part and a second housing part, wherein the electric drive is arranged with the drive shaft in the first housing part and the transmission is arranged with the input shaft in the second housing part, wherein a first input shaft end can be inserted into the drive shaft or the second drive shaft end can be inserted into the input shaft to connect the housing parts;

wherein the first housing part and the second housing part are fluidically separated from one another by at least one first seal arranged between and contacting the input shaft and the second housing part;

wherein a drive power of the electric drive is transmissible to the input shaft via the drive shaft and from the input shaft to the transmission;

wherein the drive shaft and the input shaft are arranged coaxially with one another and are connected to one another by a first form-locking connection by way of a toothing system which is connected at least in a circumferential direction; and wherein the drive shaft and the input shaft are at least connected\with respect to an axial direction by at least one of (a) a press fit formed between an inner circumferential surface and an outer circumferential surface which are parallel to an axis of rotation, or (b) the drive shaft and the input shaft together forming a second form-locking connection via a connecting element, wherein the drive shaft or the input shaft is supported on a housing of the drive assembly via a first stop with respect to the axial direction, wherein a minimum distance between (a) the second form-locking connection between the connecting element and one of the drive shaft and the input shaft, and (b) the first stop, is at least 20% of a maximum length of the shaft which forms the second form-locking connection.

* * * * *